March 21, 1961  E. SCHENKENGEL  2,975,824
DEVICE FOR SEAM WELDING THERMOPLASTIC SYNTHETIC MATERIALS
Filed Aug. 23, 1955
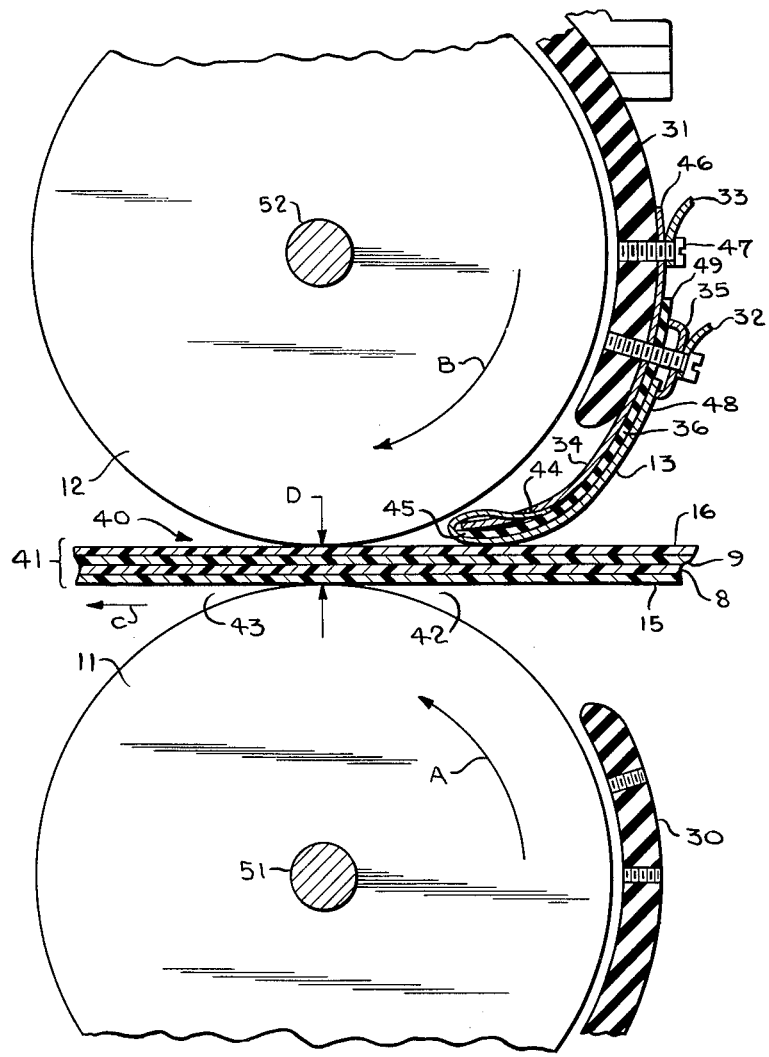
INVENTOR:
EMERICH SCHENKENGEL,
BY
HIS AGENTS.

United States Patent Office 2,975,824
Patented Mar. 21, 1961

2,975,824

DEVICE FOR SEAM WELDING THERMOPLASTIC SYNTHETIC MATERIALS

Emerich Schenkengel, Kaiserslautern, Germany, assignor to G. M. Pfaff A.G., Kaiserslautern-Pfalz, Germany, a corporation of Germany Filed Aug. 23, 1955, Ser. No. 530,156

Claims priority, application Germany Jan. 19, 1953

6 Claims. (Cl. 154—42)

The present invention relates to a device for seam welding thermoplastic synthetic materials, and more particularly to a device which operates continuously, the seam being an analog of a seam formed by means of a sewing machine in continuous operation.

The present application is a continuation-in-part of my copending application Serial No. 404,676, filed January 18, 1954, for Method and Device for the Continuous Seam-Welding of Synthetic Thermoplastic Materials, now abandoned.

It is among the principal objects of the invention to provide a machine for welding thermoplastic materials wherein the means for propulsion are separated from the heating means, the latter being arranged to apply to the materials heated in advance of the engagement by the propulsion means.

It is another object of the present invention to increase the speed at which the sheets to be welded may be propelled through the device.

It is a further object of the present invention to obtain an operation which is both more rapid and safe than in the devices known in the art.

Other objects and advantages of the present invention will become apparent from the following detailed description thereof in connection with the accompanying drawing showing, by way of example, an embodiment of the present invention. In the drawing:

The only figure is a side elevation, partly in cross section of a device according to the present invention.

Referring now to the drawing, two rollers 11 and 12 are arranged with the shafts 51, 52 thereof parallel for rotation in opposite directions indicated by the arrows A and B. The rollers 11 and 12 define a gap generally denoted by 40 between each other adapted to receive two superposed plates 8 and 9 of thermoplastic synthetic material to be seam welded to one another and two well-known buffer or protective strips 15, 16 of synthetic material superposed, respectively, upon the plates 8, 9 of thermoplastic synthetic material so as to form a set generally denoted by 41 moving in a predetermined direction at right angles to the plane connecting the shafts 51, 52 and indicated by the arrow C through the gap 40 between the rollers 11 and 12. Thus it will be seen that the gap 40 has an entrance side 42 and an exit side 43 at which the set 41 moving from the right to the left enters and leaves, respectively, the gap 40.

A pair of stationary elongated members 30 and 31 are arranged substantially parallel to the curved surfaces of the rollers 11 and 12 on the entrance side 42 of the gap 40. The stationary elongated members 30 and 31 are preferably designed as arcuate supports and are composed of electrically insulating material. Pairs of current contacts 32 and 33 are arranged, respectively, on the stationary insulating members, though only one pair has been shown namely on the member 31. An electric heating element such as a heating band 13 is connected to said pairs 32, 33 of current contacts. Only one heating band 13 is shown in the drawing for the upper elongated member or arcuate support 31; however, it should be understood that the lower stationary member 30 is provided with contacts analogous to the contacts 32 and 33 and with a heating band analogous to the heating band 13, though this has not separately been shown in the drawing.

The heating bands such as 13 are arranged on the entrance side 42 of the gap 40 and protrude into the same so as to slide on the set 41 as the set 41 moves through the gap 40 in the predetermined direction indicated by the arrow C. The heating band 13 is provided with an end portion 44 turned back over the end 45 of an insulating strip 36 preferably consisting of mica and engages a slot in a holder 34 preferably consisting of a steel band, the other end 46 of the steel band 34 being held in position by a screw 47 so as to be connected for electric conduction with the contact 33.

The contact 32 is connected by a tensioned clamp 35 or the like with the other end portion 48 of the heating band 13, the clamp 35 abutting against the end portion 49 of the mica strip 36.

The heating bands such as 13 are arranged, respectively, in separate electric circuits including pairs of contacts such as 32 and 33. If desired, these circuits may include means (not shown) for changing and measuring the currents flowing in the circuits, for instance resistors (not shown) and/or measuring instruments (not shown) such as ampere meters.

The operation of this device is as follows:

The set 41 including the superposed plates 8 and 9 of thermoplastic synthetic material and the strips 15, 16 of synthetic material is propelled by the rollers 11 and 12 rotating about the axes 51 and 52 in the directions of the arrows A and B, in a rectilinear path indicated by the arrow C. During the movement of the set 41 the end portions of the heating bands such as 13 slide at the entrance side 42 of the gap 40 resiliently on the two strips 15, 16 of synthetic material. In consequence thereof the end portions such as 44 of the heating bands such as 13 heat the plates 8, 9 of thermoplastic synthetic material before the same are subjected to the pressure exerted by the rollers 11 and 12. Thus the heating of the superposed plates 8 and 9 is effected before the same pass the welding stage proper defined by the line D of contact of the pressure rollers 11 and 12 with the superposed strips 15 and 16. In this way a sufficient softening of the material is secured before pressure is applied, since the zone 42 of the application of heat leads by a sufficient distance the line D of application of pressure. By imparting a suitable speed to the set 41 the zone 42 of application of heat may be separated in time by a regulatable period from the exertion of the welding pressure occurring in the plane defined by arrows D.

I have described hereinbefore my invention with respect to the device for seam welding thermoplastic synthetic materials shown in the drawing. However, I wish it to be understood that various changes, modifications, and/or substitutions of equivalents may be carried out in the device shown in the drawings, the protection secured by the patent being defined in the following claims.

I claim:

1. In apparatus for the heat-sealing of thermoplastic materials comprising a pair of pressure welding rollers arranged for rotation in opposite directions, to define a gap for advancing therebetween a pair of superposed plastic sheets to be sealed under pressure with protective sheets overlying the outer faces of said plastic sheets, a pair of arcuate stationary insulating supports each arranged in spaced relation and parallel, respectively, to one of the curved surfaces of said rollers near the entrance side of said sheets into said gap, and a pair of electrical heating elements each mounted upon one of said supports and arranged with their ends in resilient slidable contact engagement with the adjacent protective sheet at a point ahead of its entrance into the nip of said rollers, as the superposed plastic and protective sheets are advanced by said rollers, to pre-heat said plastic sheets to a temperature, to effect pressure welding thereof during subsequent passage between said rollers.

2. In heat-sealing apparatus as claimed in claim 1, a pair of electric terminal means for each of said heating elements mounted upon said supports and serving as mounting means for said heating elements.

3. In heat-sealing apparatus as claimed in claim 2, each said heating elements comprising a strip-like resistive conductor having one end connected to one of the associated pair of terminal means and arranged with its opposite end engaging the adjacent protective sheet, and a return conductor having one end connected to the other terminal means and having its opposite end attached to the opposite end of said first conductor.

4. In heat-sealing apparatus as claimed in claim 3, said return conductor consisting of a steel band, and an insulating spacer interposed between said conductors.

5. In heat-sealing apparatus as claimed in claim 1, said heating elements being comprised of strip-like resistive conductors curved to conform to said supports and arranged with their ends slidingly resiliently engaging said protective sheets at a point ahead of the point of entrance of said sheets into the nip of said rollers.

6. In an apparatus for heat-sealing thermoplastic materials comprising a pair of pressure welding rollers arranged for rotation in opposite directions, to define a gap therebetween for advancing a pair of superposed plastic sheets to be heat-sealed under pressure, a pair of stationary strip-like heating elements arranged at the opposite sides of the superposed sheets with their ends in resilient heat-exchanging sliding contact with said sheets at a point ahead of the point of entrance of said sheets into the nip of said rollers, to pre-heat said sheets to a temperature, to effect pressure welding thereof during subsequent passage between said rollers.

References Cited in the file of this patent

UNITED STATES PATENTS

| | | |
|---|---|---|
| 2,424,558 | Delano | July 29, 1947 |
| 2,556,008 | Spalding | June 5, 1951 |
| 2,556,452 | Spalding | June 12, 1951 |
| 2,562,641 | Saunders | July 31, 1951 |
| 2,614,953 | Anglada | Oct. 21, 1952 |
| 2,680,471 | Mercer | June 8, 1954 |
| 2,706,233 | Yamaguchi | Apr. 12, 1955 |
| 2,722,735 | Beamish | Nov. 8, 1955 |
| 2,762,420 | Stanton | Sept. 11, 1956 |
| 2,766,809 | Parham | Oct. 16, 1956 |
| 2,788,838 | Crabbe et al. | Apr. 16, 1957 |
| 2,800,162 | Rohdin | July 23, 1957 |